(12) United States Patent
Eoh et al.

(10) Patent No.: US 11,960,297 B2
(45) Date of Patent: Apr. 16, 2024

(54) ROBOT GENERATING MAP BASED ON MULTI SENSORS AND ARTIFICIAL INTELLIGENCE AND MOVING BASED ON MAP

(71) Applicant: LG ELECTRONICS INC., Seoul (KR)

(72) Inventors: Gyuho Eoh, Seoul (KR); Jungsik Kim, Seoul (KR); Hyoungrock Kim, Seoul (KR); Dong Ki Noh, Seoul (KR); Joongtae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 16/964,176

(22) PCT Filed: May 3, 2019

(86) PCT No.: PCT/KR2019/005305
§ 371 (c)(1),
(2) Date: Jul. 22, 2020

(87) PCT Pub. No.: WO2020/226187
PCT Pub. Date: Nov. 12, 2020

(65) Prior Publication Data
US 2021/0356293 A1   Nov. 18, 2021

(51) Int. Cl.
*G05D 1/02* (2020.01)
*G01C 21/00* (2006.01)
(Continued)

(52) U.S. Cl.
CPC ....... *G05D 1/0274* (2013.01); *G01C 21/3848* (2020.08); *G01S 17/86* (2020.01);
(Continued)

(58) Field of Classification Search
CPC .. G01C 21/206; G05D 1/0272; G05D 1/0274; G06T 7/73; G06T 7/75;
(Continued)

(56) References Cited

U.S. PATENT DOCUMENTS

| | | | |
|---|---|---|---|
| 7,363,157 B1 * | 4/2008 | Hanna | G01C 11/00 |
| | | | 702/5 |
| 9,870,624 B1 * | 1/2018 | Narang | G06T 7/74 |

(Continued)

FOREIGN PATENT DOCUMENTS

| | | |
|---|---|---|
| KR | 20180044486 | 5/2018 |
| KR | 20180117879 | 10/2018 |
| KR | 20190045006 | 5/2019 |

OTHER PUBLICATIONS

Su, Zerong et al., "Global Localization of a Mobile Robot Using Lidar and Visual Features", Proceedings of the 2017 IEEE International Conference on Robotics and Biomimetics, Dec. 5-8, 2017, Macau SAR, China, pp. 2377-2383 (Year: 2017).*

(Continued)

*Primary Examiner* — David A Testardi
(74) *Attorney, Agent, or Firm* — LEE, HONG, DEGERMAN, KANG & WAIMEY

(57) ABSTRACT

Disclosed herein is a robot generating a map based on multi sensors and artificial intelligence and moving based on the map, the robot according to an embodiment including a controller generating a pose graph that includes a LiDAR branch including one or more LiDAR frames, a visual branch including one or more visual frames, and a backbone including two or more frame nodes registered with any one or more of the LiDAR frames or the visual frames, and generating orodometry information that is generated while the robot is moving between the frame nodes.

20 Claims, 13 Drawing Sheets

(51) Int. Cl.
*G01S 17/86* (2020.01)
*G01S 17/89* (2020.01)
*G01S 17/894* (2020.01)
*G05D 1/00* (2006.01)

(52) U.S. Cl.
CPC ............ *G01S 17/89* (2013.01); *G01S 17/894* (2020.01); *G05D 1/0251* (2013.01); *G05D 1/0272* (2013.01); *G05D 2201/0203* (2013.01); *G05D 2201/0207* (2013.01)

(58) Field of Classification Search
CPC ......... G06T 2207/200072; G06T 2207/20221; G06T 2207/20072; G01S 17/86; G01S 17/89; G09B 29/003; G09B 29/004; G09B 29/005; G09B 29/007
See application file for complete search history.

(56) References Cited

U.S. PATENT DOCUMENTS

| | | | | |
|---|---|---|---|---|
| 10,582,137 | B1* | 3/2020 | Benemann | G01S 17/08 |
| 11,092,690 | B1* | 8/2021 | Meier | G01S 17/89 |
| 11,554,495 | B2* | 1/2023 | Eoh | B25J 11/008 |
| 11,579,626 | B2* | 2/2023 | Eoh | G05D 1/0272 |
| 2012/0306847 | A1* | 12/2012 | Lim | G06T 7/579 345/418 |
| 2014/0376777 | A1* | 12/2014 | Churchill | G01C 21/26 382/104 |
| 2015/0317781 | A1* | 11/2015 | Napier | G06T 5/002 348/46 |
| 2015/0379766 | A1* | 12/2015 | Newman | H04N 5/2253 356/5.01 |
| 2016/0209846 | A1* | 7/2016 | Eustice | G05D 1/0248 |
| 2017/0212529 | A1* | 7/2017 | Kumar | G01C 21/165 |
| 2018/0149753 | A1 | 5/2018 | Shin et al. | |
| 2018/0204338 | A1* | 7/2018 | Narang | G06T 7/55 |
| 2018/0232947 | A1* | 8/2018 | Nehmadi | G01S 7/295 |
| 2018/0286128 | A1* | 10/2018 | Eade | G06T 19/006 |
| 2018/0288386 | A1* | 10/2018 | Lazarow | H04N 13/128 |
| 2018/0306584 | A1* | 10/2018 | Merfels | G01C 22/025 |
| 2019/0056501 | A1* | 2/2019 | Yu | G01S 17/89 |
| 2019/0086539 | A1* | 3/2019 | Shin | G01S 7/4813 |
| 2019/0179307 | A1* | 6/2019 | Anderson | G05D 1/0246 |
| 2019/0235083 | A1* | 8/2019 | Zhang | G01S 7/51 |
| 2019/0287311 | A1* | 9/2019 | Bhatnagar | G06T 15/08 |
| 2019/0304170 | A1* | 10/2019 | Meilland | G06T 15/20 |
| 2019/0323845 | A1* | 10/2019 | Agarwal | G05D 1/0231 |
| 2019/0346271 | A1* | 11/2019 | Zhang | G01S 17/89 |
| 2019/0353758 | A1 | 11/2019 | Shin et al. | |
| 2020/0116498 | A1* | 4/2020 | Xiong | G05D 1/0274 |
| 2020/0217666 | A1* | 7/2020 | Zhang | H04W 4/029 |
| 2020/0306983 | A1* | 10/2020 | Noh | B25J 13/08 |
| 2020/0376676 | A1* | 12/2020 | Eoh | B25J 9/1697 |
| 2021/0293963 | A1* | 9/2021 | Nehmadi | G06K 9/6215 |
| 2021/0356293 | A1* | 11/2021 | Eoh | G01S 17/89 |
| 2021/0405649 | A1* | 12/2021 | Eoh | G05D 1/0274 |
| 2021/0405650 | A1* | 12/2021 | Eoh | G01S 17/931 |

OTHER PUBLICATIONS

Shin, Young-Sik et al., "Direct Visual SLAM using Sparse Depth for Camera-LiDAR System", 2018 IEEE International Conference on Robotics and Automation (ICRA), May 21-25, 2018, Brisbane, Australia, pp. 5144-5151 (Year: 2018).*

Wu, Fangyi et al., "Vision-and-Lidar Based Real-time Outdoor Localization for Unmanned Ground Vehicles without GPS", Proceeding of the IEEE International Conference on Information and Automation, Wuyi Mountain, China, Aug. 2018, pp. 232-237 (Year: 2018).*

* cited by examiner

ROBOT GENERATING MAP BASED ON MULTI SENSORS AND ARTIFICIAL INTELLIGENCE AND MOVING BASED ON MAP

CROSS-REFERENCE TO RELATED APPLICATION(S)

This application is the National Stage filing under 35 U.S.C. 371 of International Application No. PCT/KR2019/005305, filed on May 3, 2019, the contents of which are all hereby incorporated by reference herein in their entirety.

TECHNICAL FIELD

The present disclosure relates to a robot generating a map based on multi sensors and artificial intelligence and moving based on the map.

BACKGROUND

A large-scale retail store, a department store, an airport, a golf course, and the like are places where exchange of goods and services takes place between people. Robots may be useful in the places to offer information or convenience to people.

Robots may be classified as guide robots, security robots, cleaning robots and the like. The robots move in a space, confirming their positions.

The robots are required for holding information on a space, on their current positions, or on a path previously moved by the robots and the like such that the robots move confirming their positions and avoiding obstacles.

The robots may store maps to confirm a space and to move in the space. To generate a map, the robots may draw up a map using a variety of sensors, and may match and store various pieces of information in the map.

However, the sensors have their own features and make errors while the robots are moving. Accordingly, technologies for generating a map reflecting the features and errors are required.

DISCLOSURE

Technical Problems

As a means to solve the above-described problems, the present disclosure is directed to allow a robot to generate heterogeneous maps for a space using various sensors.

Additionally, the present disclosure is directed to implement fusion SLAM that identifies the position of a robot using various sensors in a space.

Further, the present disclosure is directed to separate out from heterogeneous maps and provide the separated maps, thereby enabling a robot to use a single type of sensor.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

A robot generating a map based on multi sensors and artificial intelligence according to an embodiment may include a LiDAR sensor sensing a distance between an object outside of the robot and the robot and generating a LiDAR frame, and a camera sensor capturing an image of an object placed outside of the robot and generating a visual frame.

The robot generating a map based on multi sensors and artificial intelligence according to an embodiment may include a controller that generates a pose graph comprised of a LiDAR branch including one or more of the LiDAR frames, a visual branch including one or more of the visual frames, and a backbone including two or more frame nodes registered with any one or more of the LiDAR frames or the visual frames, and that generates orodometry information which is generated while the robot is moving between the frame nodes.

The robot generating a map based on multi sensors and artificial intelligence according to an embodiment may include a map storage storing the LiDAR branch, the visual branch, the backbone, the odometry information between the frame nodes and the pose graph.

The robot generating a map based on multi sensors and artificial intelligence according to an embodiment may generate a new frame node on the basis of a distance or an angle between the position of a previous frame node and a current position, and may search the map storage for any one or more of the visual frames or the LiDAR frames capable of being registered at the current position, and may register the searched frame in the new frame node generated.

The robot generating a map based on multi sensors and artificial intelligence according to an embodiment may generate a vision-only pose graph in which a LiDAR frame registered in the frame node constituting the backbone is removed from the pose graph.

The robot generating a map based on multi sensors and artificial intelligence according to an embodiment may generate a LiDAR-only pose graph in which a visual frame registered in the frame node constituting the backbone is removed from the pose graph.

The robot moving using a map generated based on multi sensors and artificial intelligence according to an embodiment may include a controller that calculates a current position of the robot by comparing a frame registered in the frame node of the pose graph with a first LiDAR frame generated by the LiDAR sensor or with a first visual frame generated by the camera sensor or by using the odometry information.

Advantageous Effects

The present disclosure according to embodiments enables a robot to generate heterogeneous maps for a space using various sensors.

Additionally, the present disclosure according to embodiments enables a robot to perform fusion-SLAM in a space using various sensors.

Further, the present disclosure according to embodiments makes it possible to extract a partial map from a map comprised of various sensors and to perform SLAM appropriate for a robot.

Effects of the present disclosure are not limited to the above-described ones, and one having ordinary skill in the art to which the disclosure pertains may easily draw various effects from the configuration of the disclosure.

DETAILED DESCRIPTION

Figure 1:
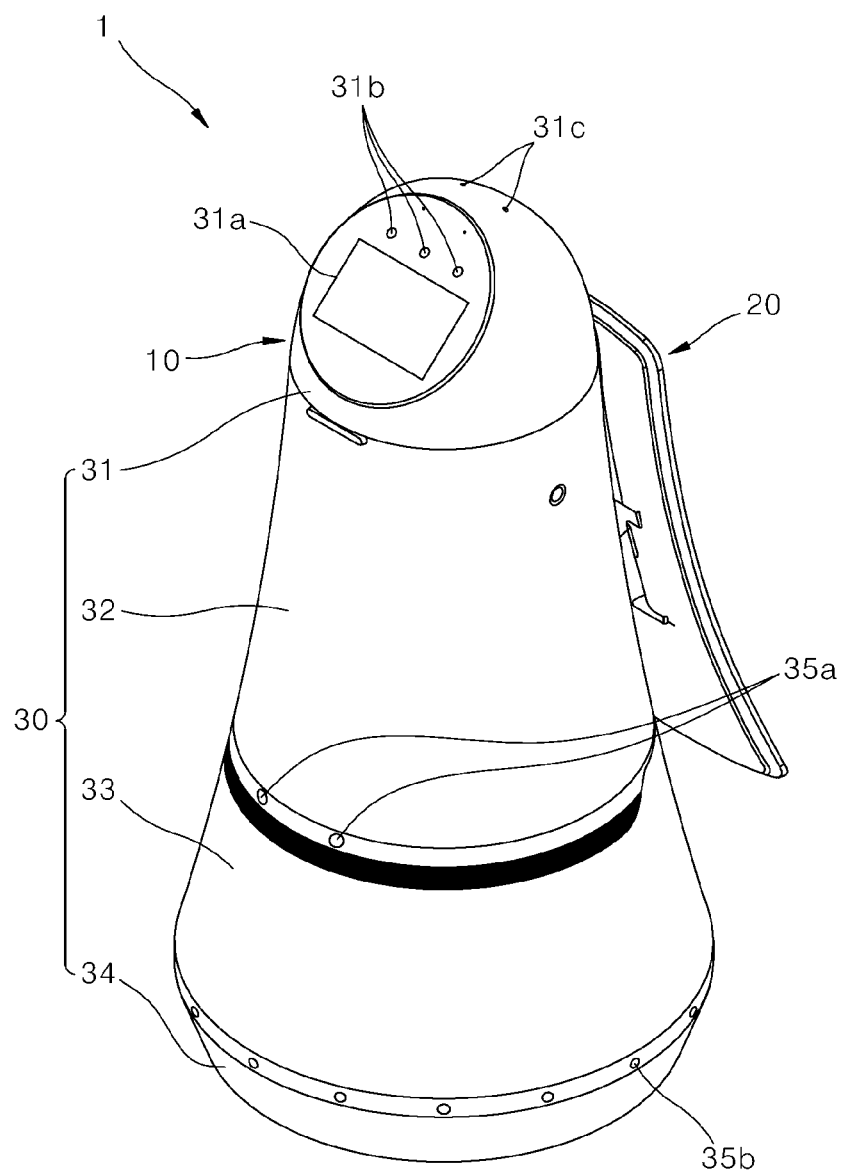
FIG. 1 shows an appearance of a robot according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot includes devices that are used for specific purposes (cleaning, ensuring security, monitoring, guiding and the like) or that moves offering functions according to features of a space in which the robot is moving, hereunder. Accordingly, in this specification, devices that have transportation means capable of moving using predetermined information and sensors, and that offer predetermined functions are generally referred to as a robot.

In this specification, a robot may move with a map stored in it. The map denotes information on fixed objects such as fixed walls, fixed stairs and the like that do not move in a space. Additionally, information on movable obstacles that are disposed periodically, i.e., information on dynamic objects may be stored on the map.

As an example, information on obstacles disposed within a certain range with respect to a direction in which the robot moves forward may also be stored in the map. In this case, unlike the map in which the above-described fixed objects are stored, the map includes information on obstacles, which is registered temporarily, and then removes the information after the robot moves.

Further, in this specification, the robot may confirm an external dynamic object using various sensors. When the robot moves to a destination in an environment that is crowded with a large number of pedestrians after confirming the external dynamic object, the robot may confirm a state in which waypoints to the destination are occupied by obstacles.

Furthermore, the robot may determine the robot arrives at a waypoint on the basis of a degree in a change of directions of the waypoint, and the robot moves to the destination of the next waypoint successfully.

FIG. 1 shows an appearance of a robot according to an embodiment. FIG. 1 shows an exemplary appearance. The robot may be implemented as robots having various appearances in addition to the appearance of FIG. 1. Specifically, each component may be disposed in different positions in the upward, downward, leftward and rightward directions on the basis of the shape of a robot.

A main body 10 may be configured to be long in the up-down direction, and may have the shape of a roly poly toy that gradually becomes slimmer from the lower portion toward the upper portion, as a whole.

The main body 10 may include a case 30 that forms the appearance of the robot 1. The case 30 may include a top cover 31 disposed on the upper side, a first middle cover 32 disposed on the lower side of the top cover 31, a second middle cover 33 disposed on the lower side of the first middle cover 32, and a bottom cover 34 disposed on the lower side of the second middle cover 33. The first middle cover 32 and the second middle cover 33 may constitute a single middle cover.

The top cover 31 may be disposed at the uppermost end of the robot 1, and may have the shape of a hemisphere or a dome. The top cover 31 may be disposed at a height below the average height for adults to readily receive an instruction from a user. Additionally, the top cover 31 may be configured to rotate at a predetermined angle.

The robot 1 may further include a control module 150 therein. The control module 150 controls the robot 1 like a type of computer or a type of processor. Accordingly, the control module 150 may be disposed in the robot 1, may perform functions similar to those of a main processor, and may interact with a user The control module 150 is disposed in the robot 1 to control the robot during robot's movement by sensing objects around the robot. The control module 150 of the robot may be implemented as a software module, a chip in which a software module is implemented as hardware, and the like.

A display unit 31a that receives an instruction from a user or that outputs information, and sensors, for example, a camera 31b and a microphone 31c may be disposed on one side of the front surface of the top cover 31.

In addition to the display unit 31a of the top cover 31, a display unit 20 is also disposed on one side of the middle cover 32.

Information may be output by all the two display units 31a, 20 or may be output by any one of the two display units 31a, 20 according to functions of the robot.

Additionally, various obstacle sensors (220 in FIG. 2) are disposed on one lateral surface or in the entire lower end portion of the robot 1 like 35a, 35b. As an example, the obstacle sensors include a time-of-flight (TOF) sensor, an ultrasonic sensor, an infrared sensor, a depth sensor, a laser sensor, and a LiDAR sensor and the like. The sensors sense an obstacle outside of the robot 1 in various ways.

Additionally, the robot in FIG. 1 further includes a moving unit that is a component moving the robot in the lower end portion of the robot. The moving unit is a component that moves the robot, like wheels.

The shape of the robot in FIG. 1 is provided as an example. The present disclosure is not limited to the example. Additionally, various cameras and sensors of the robot may also be disposed in various portions of the robot 1. As an example, the robot of FIG. 1 may be a guide robot that gives information to a user and moves to a specific spot to guide a user.

The robot in FIG. 1 may also include a robot that offers cleaning services, security services or functions. The robot may perform a variety of functions. However, in this specification, the focus is on a guide robot for convenience of description.

In a state in which a plurality of the robots in FIG. 1 are disposed in a service space, the robots perform specific functions (guide services, cleaning services, security services and the like). In the process, the robot 1 may store information on its position, may confirm its current position in the entire space, and may generate a path required for moving to a destination.

Figure 2:
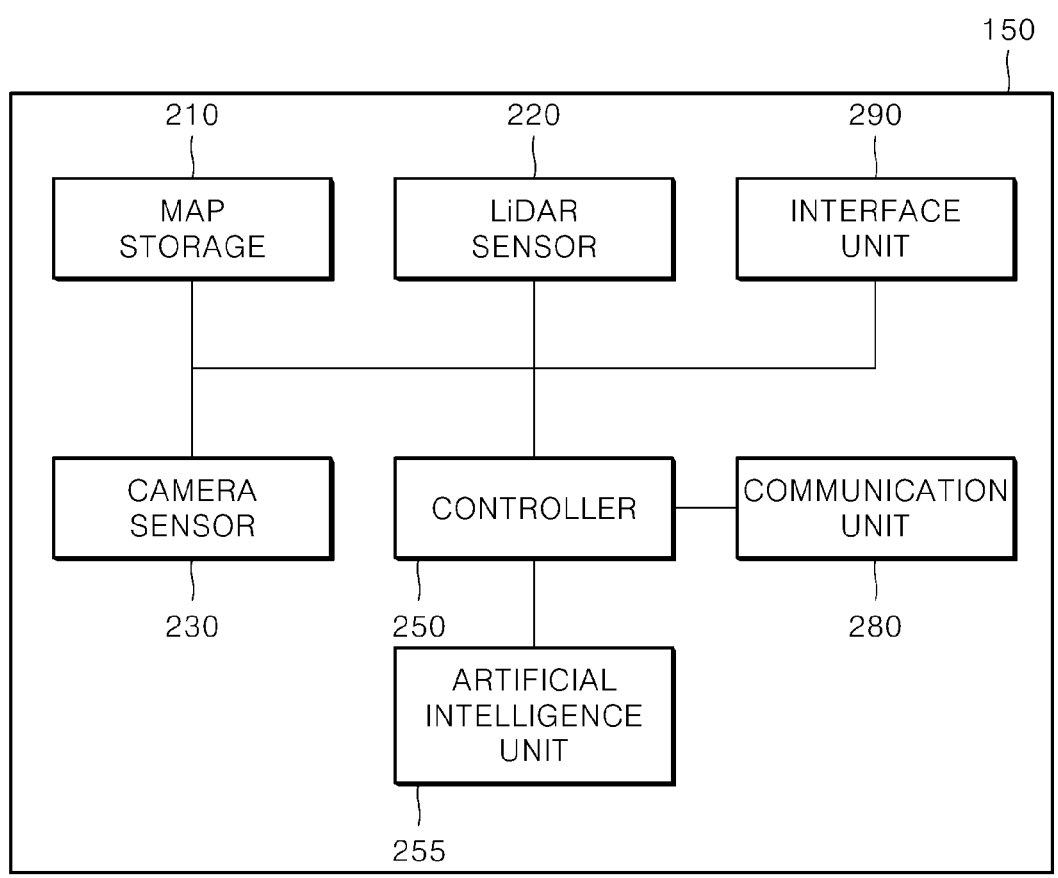
FIG. 2 shows components of a control module of a robot according to an embodiment.

FIG. 2 shows components of a control module of a robot according to an embodiment.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. That is, the LiDAR sensor 220 senses a distance between an object disposed outside the robot and the robot to generate a LiDAR frame.

As an example, a camera sensor 230 is a regular camera. To overcome viewing angle limitations, two or more camera sensors 230 may be used. An image captured in a specific position constitutes vision information. That is, the camera sensor 230 captures image of an object outside the robot and generates a visual frame including vision information.

The robot 1, to which the present disclosure is applied, performs fusion-simultaneous localization and mapping (Fusion-SLAM) using the LiDAR sensor 220 and the camera sensor 230.

In fusion SLAM, LiDAR information and vision information may be combinedly used. The LiDAR information and vision information may be configured as maps.

Unlike a robot that uses a single sensor (LiDAR-only SLAM, visual-only SLAM), a robot that uses fusion-SLAM may enhance accuracy of estimating a position. That is, when fusion SLAM is performed by combining the LiDAR information and vision information, map quality may be enhanced.

The map quality is a criterion applied to both of the vision map comprised of pieces of vision information, and the LiDAR map comprised of pieces of LiDAR information. At the time of fusion SLAM, map quality of each of the vision map and LiDAR map is enhanced because sensors may share information that is not sufficiently acquired by each of the sensors.

Additionally, LiDAR information or vision information may be extracted from a single map and may be used. For example, LiDAR information or vision information, or all the LiDAR information and vision information may be used for localization of the robot in accordance with an amount of memory held by the robot or a calculation capability of a calculation processor, and the like.

An interface unit 290 receives information input by a user. The interface unit 290 receives various pieces of information such as a touch, a voice and the like input by the user, and outputs results of the input. Additionally, the interface unit 290 may output a map stored by the robot 1 or may output a course in which the robot moves by overlapping on the the map.

Further, the interface unit 290 may supply predetermined information to a user.

A controller 250 generates a map as in FIG. 4 that is described below, and on the basis of the map, estimates a position of the robot in the process in which the robot moves.

A communication unit 280 may allow the robot 1 to communicate with another robot or an external server and to receive and transmit information.

The robot 1 may generate each map using each of the sensors (a LiDAR sensor and a camera sensor), or may generate a single map using each of the sensors and then may generate another map in which details corresponding to a specific sensor are only extracted from the single map.

Additionally, the map of the present disclosure may include odometry information on the basis of rotations of wheels. The odometry information is information on distances moved by the robot, which are calculated using frequencies of rotations of a wheel of the robot or using a difference in frequencies of rotations of both wheels of the robot, and the like. The robot may calculate a distance moved by the robot using the odometry information in addition to information sensed by sensors.

The controller 250 in FIG. 2 may further include an artificial intelligence unit 255 for artificial intelligence work and processing.

A plurality of LiDAR sensors 220 and camera sensors 230 may be disposed outside of the robot 1 to identify external objects.

In addition to the LiDAR sensor 220 and camera sensor 230 in FIG. 2, various types of sensors (a LiDAR sensor, an infrared sensor, an ultrasonic sensor, a depth sensor, an image sensor, a microphone, and the like) are disposed outside of the robot 1. The controller 250 collects and processes information sensed by the sensors.

The artificial intelligence unit 255 may input information that is processed by the LiDAR sensor 220, the camera sensor 230 and the other sensors, or information that is accumulated and stored while the robot 1 is moving, and the like, and may output results required for the controller 250 to determine an external situation, to process information and to generate a moving path.

As an example, the robot 1 may store information on positions of various objects, disposed in a space in which the robot is moving, as a map. The objects include a fixed object such as a wall, a door and the like, and a movable object such as a flower pot, a desk and the like. The artificial intelligence unit 255 may output data on a path taken by the robot, a range of work covered by the robot, and the like, using map information and information supplied by the LiDAR sensor 220, the camera sensor 230 and the other sensors.

Additionally, the artificial intelligence unit 255 may recognize objects disposed around the robot using information supplied by the LiDAR sensor 220, the camera sensor 230 and the other sensors. The artificial intelligence unit 255 may output meta information on an image by receiving the image. The meta information includes information on the name of an object in an image, a distance between an object and the robot, the sort of an object, whether an object is disposed on a map, and the like.

Information supplied by the LiDAR sensor 220, the camera sensor 230 and the other sensors is input to an input node of a deep learning network of the artificial intelligence unit 255, and then results are output from an output node of the artificial intelligence unit 255 through information processing of a hidden layer of the deep learning network of the artificial intelligence unit 255.

The controller 250 may calculate a moving path of the robot using date calculated by the artificial intelligence unit 255 or using data processed by various sensors.

Figure 3:
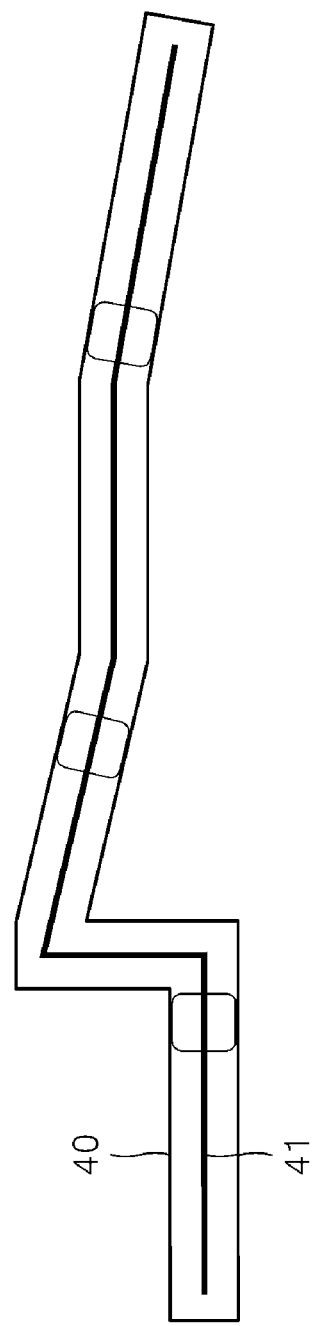
FIG. 3 shows a process in which a robot moves in a space.

FIG. 3 shows a process in which a robot moves in a space. The robot in the space may move along a line indicated by reference No. 41, and may store information, sensed by the LiDAR sensor in a specific spot, in a map storage 210 using the LiDAR sensor 220. A basic shape of a space 40 may be stored as a local map.

Additionally, the robot may store information sensed by the camera sensor in a specific spot, in the map storage 210 using the camera sensor 230 while the robot is moving in the space 40.

Figure 4:
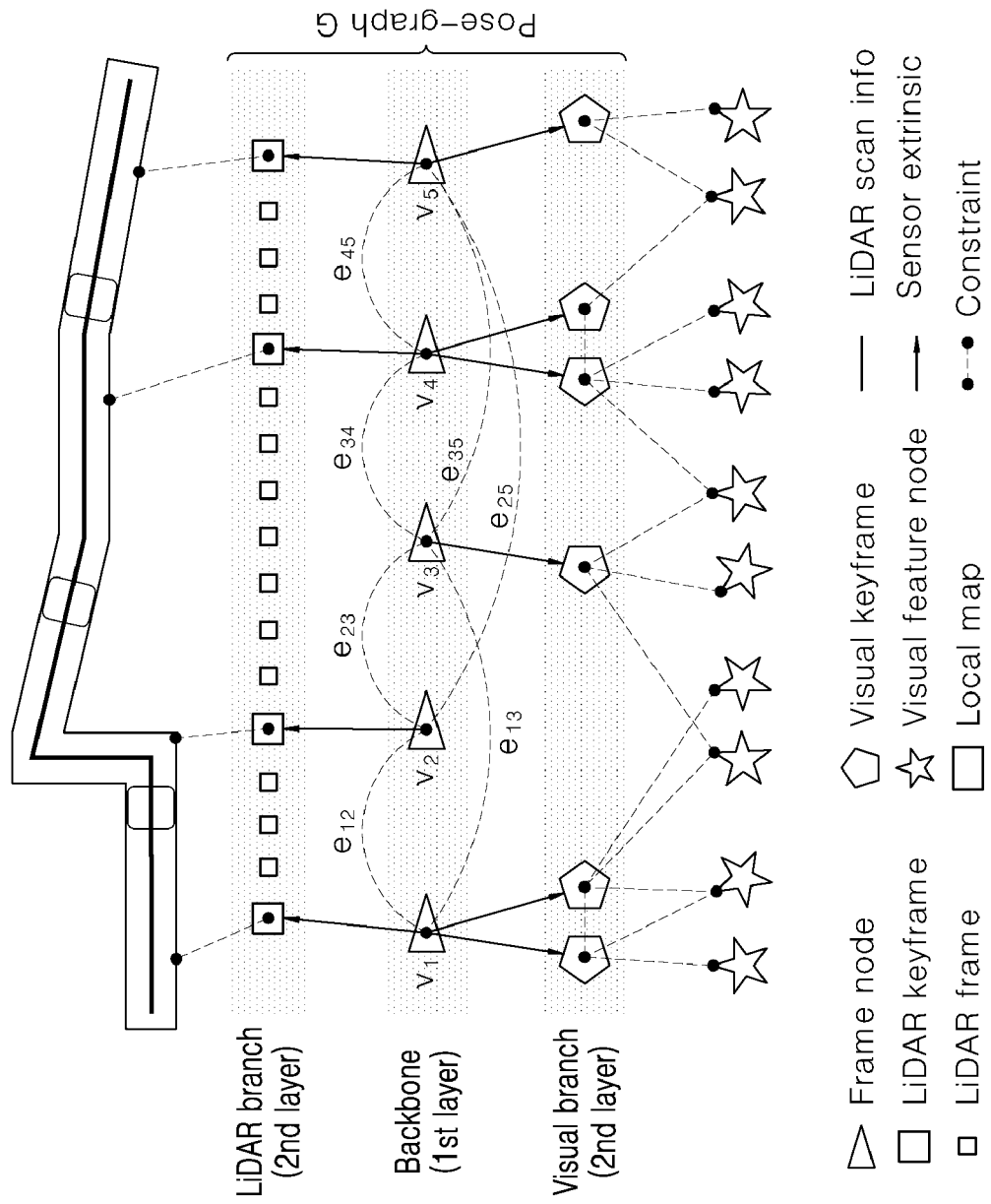
FIG. 4 shows a multiple structure of a map according to an embodiment.

FIG. 4 shows a multiple structure of a map according to an embodiment. FIG. 4 shows a double-layer structure in which a backbone is a first layer, and a LiDAR branch and a visual branch are respectively a second layer. The structure as in FIG. 4 is referred to as a structurally elastic pose graph-based SLAM.

The backbone is information on a trajectory of the robot. Additionally, the backbone includes one or more frame nodes corresponding to the trajectory. The frame nodes further include constraint information in a relation between the frame nodes and other frame nodes. An edge between nodes denotes constraint information. The edge denotes odometry constraint information (odometry constraint) or loop constraint information (loop constraint).

The LiDAR branch of the second layer is comprised of LiDAR frames. The LiDAR frames include a LiDAR sensing value that is sensed while the robot is moving. At least one or more of the LiDAR frames are set as a LiDAR keyframe.

The LiDAR keyframe has a corresponding relation with the nodes of the backbone. In FIG. 4, nodes v1, v2, v4, and v5 of the backbone indicate a LiDAR keyframe among nodes v1 to v5 of the backbone.

The visual branch of the second layer is comprised of visual keyframes. The visual keyframes indicate one or more visual feature nodes that are camera sensing values (i.e., an image captured by the camera) sensed while the robot is moving. The robot may generate a plurality of visual feature nodes on the basis of the number of camera sensors disposed in the robot.

In the map structure of FIG. 4, the LiDAR keyframe or the visual keyframe is connected to the frame node of the backbone. Certainly, the LiDAR/visual keyframe may all be connected to a single frame node (v1, v4, and v5).

Poses of the robot at the LiDAR or the visual keyframe are same, and the LiDar or the visual keyframe is connected with each frame node. An extrinsic parameter may be added for each keyframe on the basis of a position of the robot, to which the LiDAR sensor or the camera sensor is attached. The extrinsic parameter denotes information on a relative position at which a sensor is attached from the center of the robot.

The visual keyframe has a corresponding relation with the node of the backbone. In FIG. 4, nodes v1, v3, v4, and v5 of the backbone indicate a visual keyframe among nodes v1 to v5 of the backbone. In FIG. 4, a pair of visual feature nodes (visual frames), comprised of two visual feature nodes, denote that the robot 1 captures an image using two camera sensors 230. There is an increase and a decrease in the number of visual feature nodes in each position on the basis of an increase and a decrease in the number of camera sensors 230.

Edges are displayed between nodes v1 to v5 constituting the backbone of the first layer. e12, e23, e34, and e45 are edges between adjacent nodes, and e13, e35, and e25 are edges between non-adjacent nodes.

Odometry constraint information, or for short, odometry information denotes constraints between adjacent frame nodes such as e12, e23, e34, and e45. Loop constraint information, or for short, loop information denotes constraints between non-adjacent frames such as e13, e25, and e35.

The backbone is comprised of a plurality of keyframes. The controller 250 may perform an initial mapping process to add the plurality of keyframes to the backbone. The initial mapping process includes adding the LiDAR keyframe and the visual frame based on the keyframe.

The structure of FIG. 4 is briefly described as follows. The LiDAR branch includes one or more LiDAR frames. The visual branch includes one or more visual frames.

Additionally, the backbone includes two or more frame nodes in which any one or more of a LiDAR frame or a visual frame are registered. In this case, the LiDAR frame or the visual frame registered in the frame node is referred to as a keyframe. A pose graph includes the LiDAR branch, the visual branch and the backbone.

Further, the pose graph includes odometry information, loop information and the like among frame nodes. The odometry information includes information on rotations, directions, and the like of wheels, which is generated while the robot is moving between frames nodes. The loop information is based on a set of frame nodes connected using specific constraints between visual keyframes around a specific frame node within a maximum sensing distance of the LiDAR sensor 220.

The controller 250 generates the pose graph in FIG. 4. The controller 250 stores the LiDAR branch, the visual branch, the backbone, the odometry information between frame nodes, and the pose graph including the premises in the map storage 210.

Figure 5:
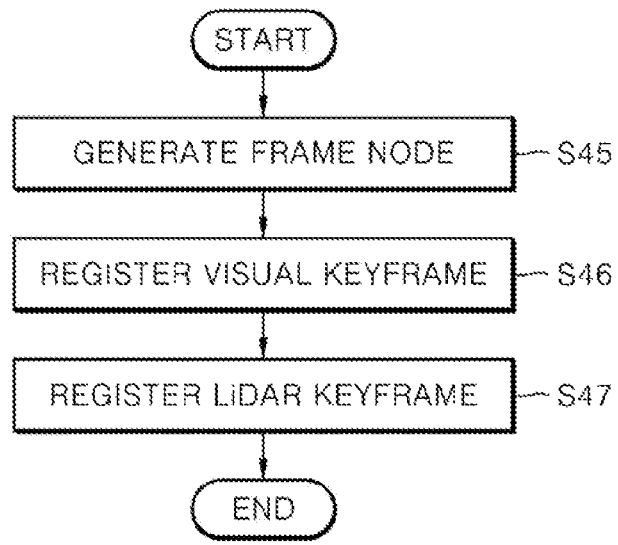
FIG. 5 shows a process of an initial mapping according to an embodiment.

FIG. 5 shows a process of an initial mapping according to an embodiment. The robot is in the state in which the robot acquires the LiDAR frame, and a visual feature node (a visual frame) in FIG. 4, by moving in a local space. Alternately, the robot may perform the process in FIG. 5 at the same time as the robot acquires the LiDAR frame and the visual feature node in FIG. 4 in real time, while moving in the local space.

First, the controller 250 generates a frame node constituting a backbone of a first layer (S45). The frame node is based on a constant distance and angle between nodes. Additionally, the controller 250 generates a frame node when there is any one of LiDAR information (a LiDAR frame) or vision information (a visual frame) at a corresponding position.

Further, the controller 250 may generate a node additionally to generate a specific destination (a drugstore, an information desk and the like). This is possible when a user preset a specific destination or when a user designates the corresponding position as a node previously during the process of generating a frame node.

By reflecting a distance and an angle between nodes in the generation of a frame node, an overlapped node is prevented from being generated when the robot stops.

Next, in the process of registering a visual keyframe (S46), the visual keyframe is registered when there is a big difference in angles between an existing frame and the robot. This is also to prevent the generation of an overlapped keyframe.

Additionally, the controller 250 confirms whether a captured image has enough information to be registered as a visual keyframe, by calculating the number of feature points in the image. If the image is same-colored as a whole (e.g., a wall), or if the image shows people (without feature points), the controller 250 does not register the image as a visual keyframe.

Further, in the process of registering a LiDAR keyframe, the robot generates a keyframe when overlapped areas in LiDAR information are reduced, and the LiDAR information is sensed while the robot is moving. LiDAR information within close distances may be the same. Accordingly, only when pieces of LiDAR information are different from each other because of a difference in distances, the LiDAR frame can be registered as a keyframe.

In steps 45 to 47, the robot collects LiDAR information and vision information in real time while the robot is moving, and the controller 250 may register a frame node of a backbone and a visual keyframe, LiDAR keyframe in real time.

Alternately, the controller 250 may register a frame node of a backbone and a visual keyframe, a LiDAR keyframe after the robot collects and stores LiDAR information and vision information previously while moving primarily.

Additionally, the controller 250 may add odometry constraint information and loop constraint information between nodes as edges while generating a frame node of a backbone.

FIG. 5 is briefly described as follows. The controller 250 generates a new node frame on the basis of a distance or an angle between a previous frame node and a current position (S45). Additionally, the controller 250 searches the map storage 210 for any one or more of the visual frame or the LiDAR frame that may be registered at the current position, and registers any one or more of the visual frame or the LiDAR frame in the new frame node generated in step 45. (S46, S47).

Certainly, when there is no visual frame/LiDAR frame with respect to the new frame node, the controller 250 may also generate a new LiDAR frame/visual frame using the LiDAR sensor 220 or the camera sensor 230.

Figure 6:
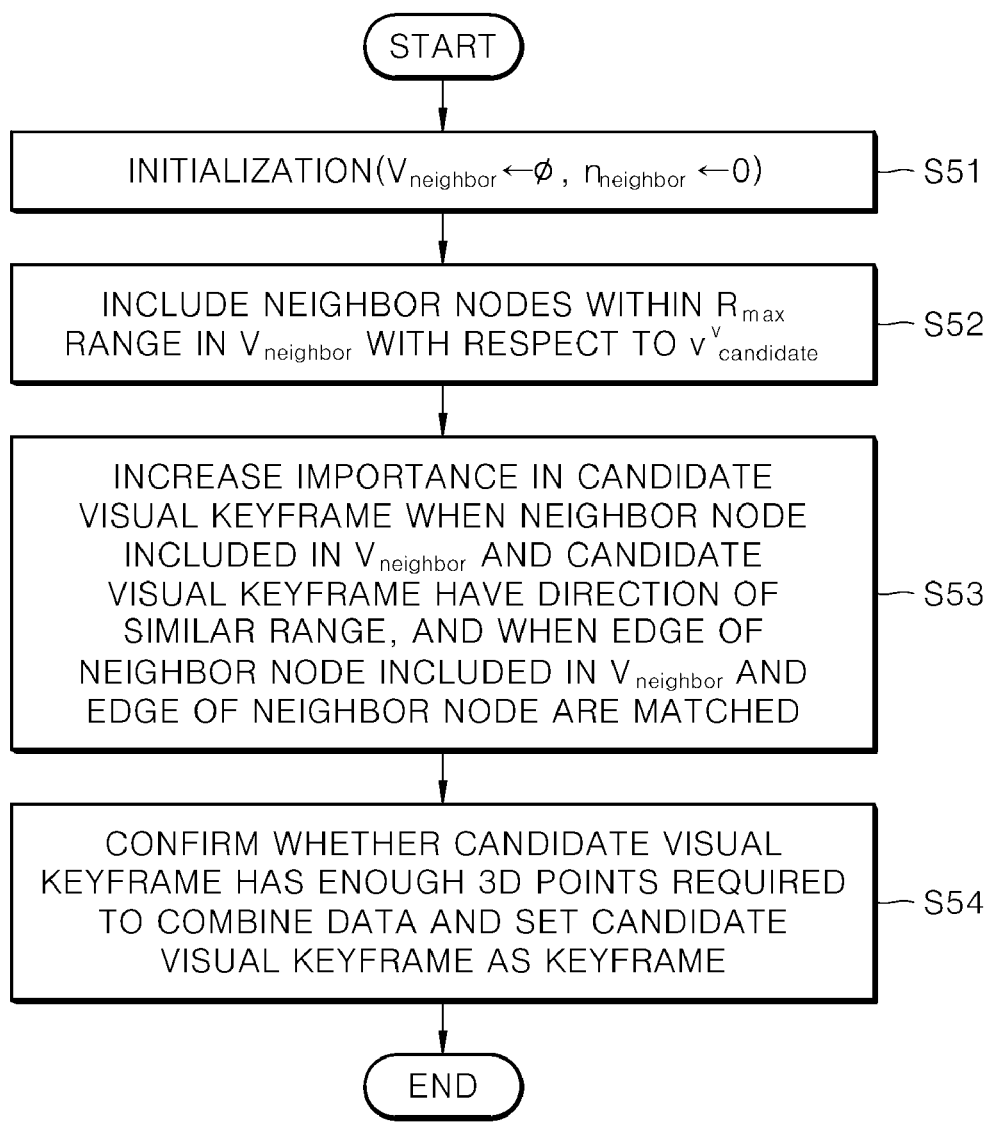
FIG. 6 shows a process of generating a visual keyframe according to an embodiment.

FIG. 6 shows a process of generating a visual keyframe according to an embodiment. The controller 250 selects a visual keyframe appropriate for SLAM among pieces of input vision information.

The controller 250 performs initialization (S51). Initialization denotes that the controller 250 sets a set of neighbor nodes ($V_{neighbor}$) to an empty set ($\Phi$) and sets the number of neighbor nodes ($n_{neighbor}$) to 0

Additionally, the controller 250 includes nodes located within a maximum angle of a candidate area ($R_{max}$) among nodes located within a certain distance from a candidate visual keyframe ($v^v_{candidate}$) as neighbor nodes ($V_{neighbor}$) (S52). The maximum angle of a candidate area ($R_{max}$) denotes a maximum search range required for identifying an overlapped visual keyframe. For example, when the maximum angle of a candidate area ($R_{max}$) is small, a map with high density may be drawn up.

When a set of neighbor nodes are set, there are neighbor nodes having a difference in directions of $\theta_{reg}$ or less with respect to a visual keyframe, and when edges of the visual keyframe and the neighbor nodes are matched with a pose graph, this may be determined as an important keyframe for estimating a position (S53).

In the following step, the controller confirms whether the candidate visual keyframe has sufficient 3D points. If the candidate visual keyframe has sufficient 3D points, the candidate visual keyframe may be added as a keyframe in the pose graph including a backbone in FIG. 4 (S54).

A criterion for 3D points, $N_{min}^{3D\_point}$, denotes a minimum 3D point for registering as a keyframe.

The process in FIG. 6 may be repeated when the camera sensor collects images. The process of FIG. 6 is implemented as an exemplary pseudo code as follows. Step 51 corresponds to below-described line 1, and step 52 corresponds to below-described line 2. Step 53 corresponds to below-described lines 3-8. Step 54 corresponds to below-described lines 9-14.

| | |
|---|---|
| Input | Candidate visual frame: $v_{candidate}^v$ |
| | Maximum radius of candidate region: $R_{max}$ |
| | Minimum number of 3D point for registration: $N_{min}^{3D\_point}$ |
| | Reference angle for registration: $\theta_{reg}$ |
| Output | Whether $V_{candidate}^v$ can be a keyframe or not |
| 1 | Initialize set: $V_{neighbor} \leftarrow \emptyset$, $n_{neighbor} \leftarrow 0$ |
| 2 | $V_{neighbor} \leftarrow$ Collect_neighbor_nodes($v_{candidate}^v$, $R_{max}$) |
| 3 | for i = 1 to $\mathcal{N}(V_{neighbor})$ |
| 4 |   if $|\theta(v_{candidate}^v) - \theta(v_i^v)| < \theta_{reg}$ and |
| 5 |     Is_neighbor_edge_consistent($v_{candidate}^v$, $v_i^v$) |
| 6 |       $n_{neighbor} \leftarrow n_{neighbor} + 1$ |
| 7 |   end if |
| 8 | end for |
| 9 | if $\mathcal{N}^{3D\_point}(V_{candidate}^v) > N_{min}^{3D\_point}$ and |
| 10 |   $n_{neighbor} \neq \mathcal{N}(V_{neighbo|r})$ |
| 11 |     return true |
| 12 | else |
| 13 |     return false |
| 14 | end if |

FIG. 6 is briefly described as follows. A visual keyframe that may be registered in a frame node is selected among visual frames. The controller 250 selects a visual keyframe on the basis of a distance and an angle between adjacent visual frames among a plurality of visual frames and on the basis of the number of feature points in a visual frame.

Additionally, as illustrated in FIG. 4, a visual branch includes a plurality of visual frames and one or more visual keyframes. The visual keyframe is a visual frame selected among the visual frames FIG. 7 shows a process of generating a LiDAR keyframe according to an embodiment.

The controller 250 may generate a LiDAR frame at a specific position while the robot is moving. Additionally, the controller registers a first LiDAR frame as a LiDAR keyframe (S56), and, while the robot 1 is moving, generates a new LiDAR frame (S57). The controller 250 selects the new LiDAR frame (S58).

The controller 250 compares the LiDAR frame selected and a keyframe previously registered, and, when an overlapped size is smaller than a certain criterion, registers the LiDAR frame selected as a keyframe (S59). Steps 57 to 59 may be repeated while the robot is moving.

Figure 7:
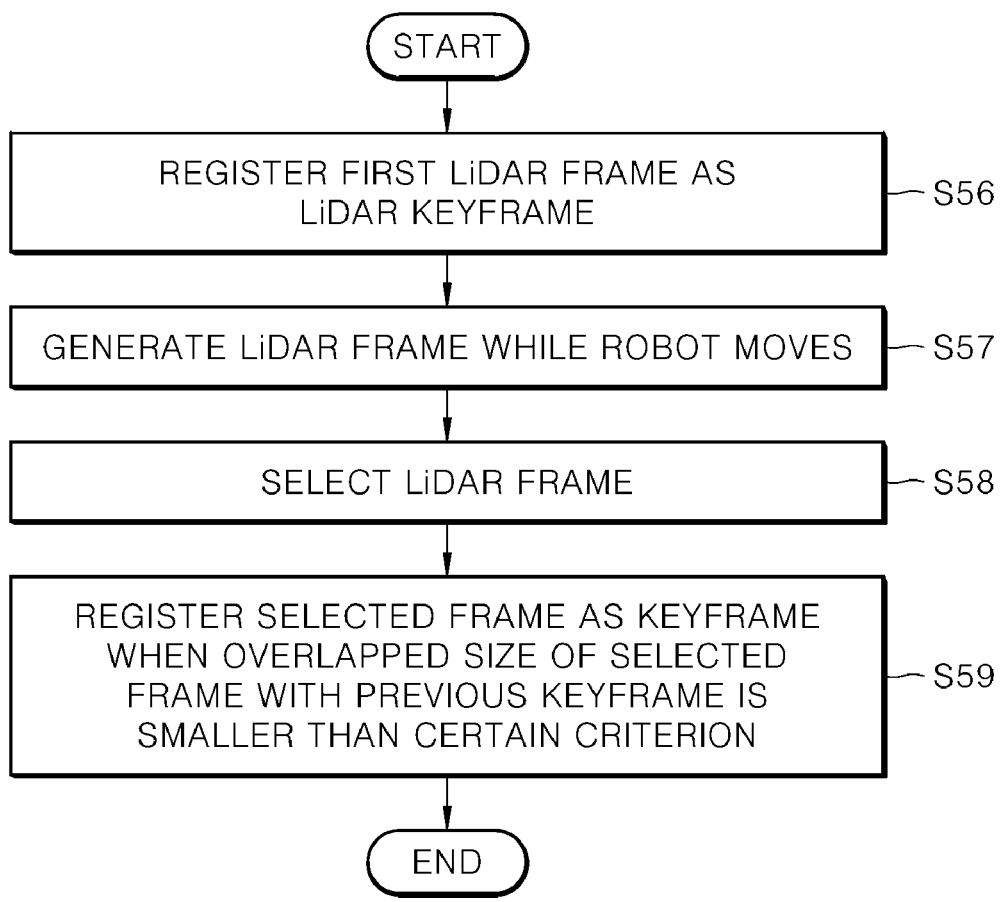
FIG. 7 shows a process of generating a LiDAR keyframe according to an embodiment.

According to the process in FIG. 7, a LiDAR frame significantly being different from a previous space and having a significant change, among LiDAR frames, may be registered as a keyframe.

FIG. 7 is briefly described as follows. The controller 250 selects a second LiDAR keyframe among a plurality of LiDAR frames on the basis of overlapped sizes of the plurality of LiDAR frames with the first LiDAR keyframe. The first LiDAR keyframe is a keyframe that has already been selected, and the second LiDAR keyframe is a keyframe that has been newly selected.

A LiDAR branch, as illustrated in FIG. 4, includes a plurality of LiDAR frames and one or more LiDAR keyframes. The LiDAR keyframe is a LiDAR frame that is selected among the plurality of LiDAR frames.

The generation of a visual keyframe and the generation of a LiDAR keyframe in FIGS. 6 and 7 may be independently performed.

The controller 250 registers a keyframe as a frame node of a backbone among keyframes generated as in FIGS. 6 and 7.

Figure 8:
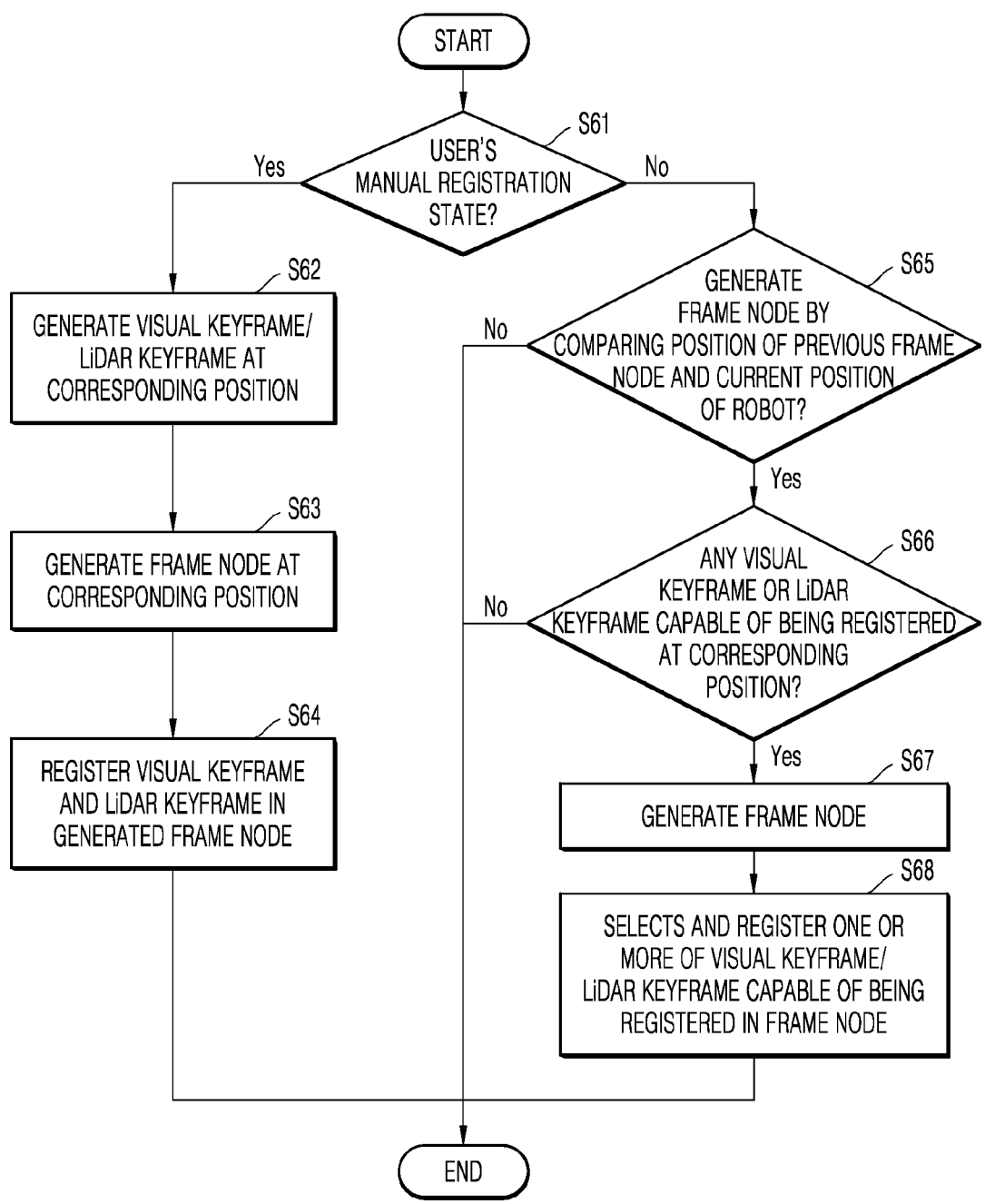
FIG. 8 shows a process of registering a frame node of a backbone according to an embodiment.

FIG. 8 shows a process of registering a frame node of a backbone according to an embodiment.

The controller 250 according to an embodiment of the present disclosure may generate a visual keyframe and a LiDAR keyframe described with reference to the process of FIGS. 6 and 7, and then may generate a frame node. Alternatively, the controller 250 may generate an additional visual keyframe and an additional LiDAR keyframe at a specific position designated by users, may generate a frame node at the position, and then may register the frame node and the visual keyframe/LiDAR keyframe.

Specifically, in a user's manual registration state (S61), a user converts a mode into a POI (Point of Interest) input mode.

That is, the interface unit 290 may receive an input of frame node addition. The interface unit may receive meta data on a current position together with the frame node addition.

In response to the input of the user, the controller 250 generates a frame node at the current position, searches a visual frame or a LiDAR frame that may be registered in the generated frame node, and registers the searched visual frame or the searched LiDAR frame in the frame node. Alternatively, the controller 250 may control the LiDAR sensor 220 or the camera sensor 230, may generate a new visual frame/LiDAR frame, and may register the generated frames in the frame node.

The controller 250 controls the camera sensor 230 at the current position of the robot 1 to generate vision information and controls the LiDAR sensor 220 to generate LiDAR information.

Additionally, the controller 250 generates a visual keyframe using the generated vision information and generates a LiDAR keyframe using the generated LiDAR information (S62). Then the controller 250 generates a frame node at the position (S63), and registers the visual keyframe and the LiDAR keyframe in the generated frame node (or associates the visual keyframe and the LiDAR keyframe with the generated frame node) (S64).

In the case of a user's non-manual registration state in step 61, the controller 250 determines whether a current position is generated as a frame node on the basis of a difference between a position of a previous frame node ($v^f_{previous}$) and a current position of the robot ($p_{current}$) (S65).

For example, the controller 250 uses a criterion that is a distance ($T_{dist}$) and an angle ($T_{angle}$) required to be satisfied between the previous frame node and a new frame node at a minimum level.

Specifically, the controller 250 confirms whether a difference between the position of the previous frame node ($v^f_{previous}$) and the current position of the robot ($p_{current}$) is greater than $T_{dist}$ or whether an angle between the position of the previous frame node ($v^f_{previous}$) and the current position of the robot ($p_{current}$) is than greater $T_{angle}$. Additionally, when there is a visual keyframe or a registable LiDAR keyframe for registration at the position (S66) in the case in which conditions in step 65 are satisfied, the controller 250 generates a frame node (S67).

When the frame node is generated, the controller 250 registers the registable visual keyframe and the registable LiDAR keyframe in the frame node (S68) at the position. The controller 250 may register only a visual keyframe in a frame node. Alternatively, the controller 250 may register only a LiDAR keyframe in a frame node. Alternatively, the controller 250 may register all the visual keyframe/LiDAR keyframe in the frame node.

The process in FIG. 8 may be repeated while the robot is moving. The process in FIG. 8 may be implemented as an exemplary pseudo code as follows. Step 61 corresponds to below-described line 1, and steps 62 to 64 correspond to below-described lines 2 to 4. Steps 65 to 68 correspond to below-described lines 5 to 18. Specifically, step 65 corresponds to lines 5 to 6, step 66 corresponds to line 7, and step 67 corresponds to line 8. Step 68 corresponds to lines 12 to 17.

| Input | Previous frame node: $v_{previous}^f$<br>Current pose of robot: $p_{current}$<br>Minimum distance and angle for registration: $T_{dist}$, $T_{angle}$ |
|---|---|
| Output | Frame node of visual-LiDAR pose-gaph |

| 1 | if (POI_request_from_a_user) |
|---|---|
| 2 |    generate both visual and LiDAR keyframes |
| 3 |    generate a frame node |
| 4 |    associate the visual and LiDAR keyframes with the frame node |
| 5 | else if $\lVert p(v_{previous}^f) - p_{current} \rVert > T_{dist}$ or |
| 6 |       $\angle(p(v_{previous}^f), p_{current}) > T_{angle}$ |
| 7 |    if visual or LiDAR keyframe decision is satisfied |
| 8 |       generate a frame node |
| 9 |    else |
| 10 |       terminate algorithm |
| 11 |    end if |
| 12 |    if visual keyframe decision is satisfied |
| 13 |       associate the visual keyframe with the frame node |
| 14 |    end if |
| 15 |    if LiDAR keyframe decision is satisfied |
| 16 |       associate the LiDAR keyframe with the frame node |
| 17 |    end if |
| 18 | end if |

According to the above-described process, the robot 1 may generate two types of maps (a vision map, and a LiDAR map) respectively, and may combine the maps with respect to a backbone. Alternately, the robot 1 may extract a map (a vision map, or a LiDAR map) required for a pose graph that has already included a single integrated backbone, and may apply the map to SLAM of the robot 1. This may be applicable in the case in which the robot 1 is equipped only with any one sensor (220 or 230), or in the case in which the robot 1 performs SLAM with respect to any one sensor.

Accordingly, in the above-described process of generating a map, the robot 1 including all the LiDAR sensor 220 and the camera sensor 230 generates two types of maps (a vision map and a LiDAR map) and generates a pose graph including a backbone, using keyframes between the maps.

Then the LiDAR MAP is installed in a robot equipped only with the LiDAR sensor 220, and the vision map is installed in a robot equipped only with the camera sensor 230. As a result, the robots that are respectively equipped with different sensors may estimate a position. Certainly, various scenarios for estimating a position, capable of being used by the robot, may be applied on the basis of features of a map.

Figure 9:
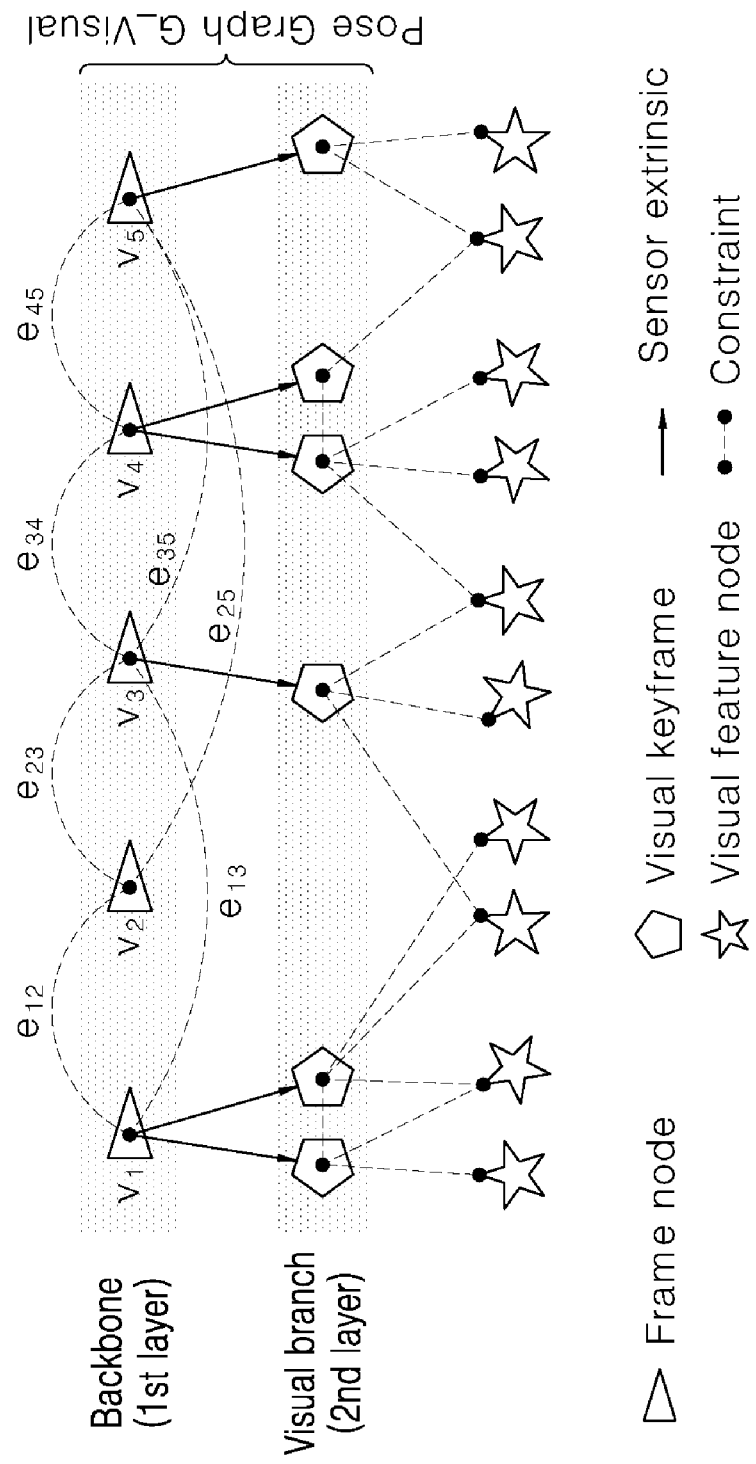
FIG. 9 shows a vision-only pose graph in which a LiDAR frame is removed from a pose graph according to an embodiment.

FIG. 9 shows a vision-only pose graph in which a LiDAR frame is removed from a pose graph according to an embodiment. A pose graph called G_Visual includes a frame node and odometry information, and a visual frame and a visual keyframe.

Figure 10:
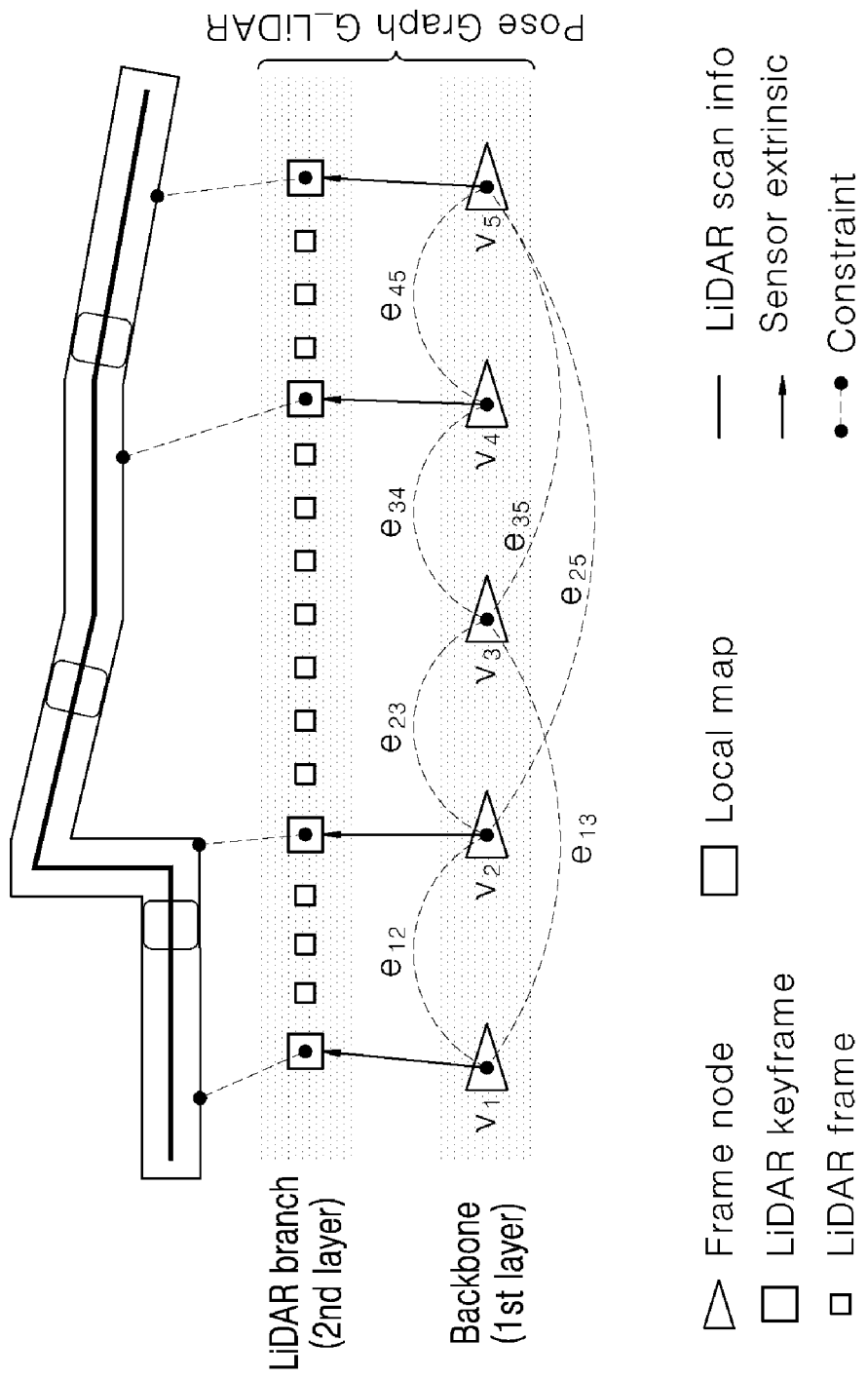
FIG. 10 shows a LiDAR-only pose graph in which a visual frame is removed from a pose graph according to an embodiment.

FIG. 10 shows a LiDAR-only pose graph in which a visual frame is removed from a pose graph according to an embodiment. A pose graph called G LiDAR includes a frame node and odometry information, and a LiDAR frame and a LiDAR keyframe.

Figure 11:
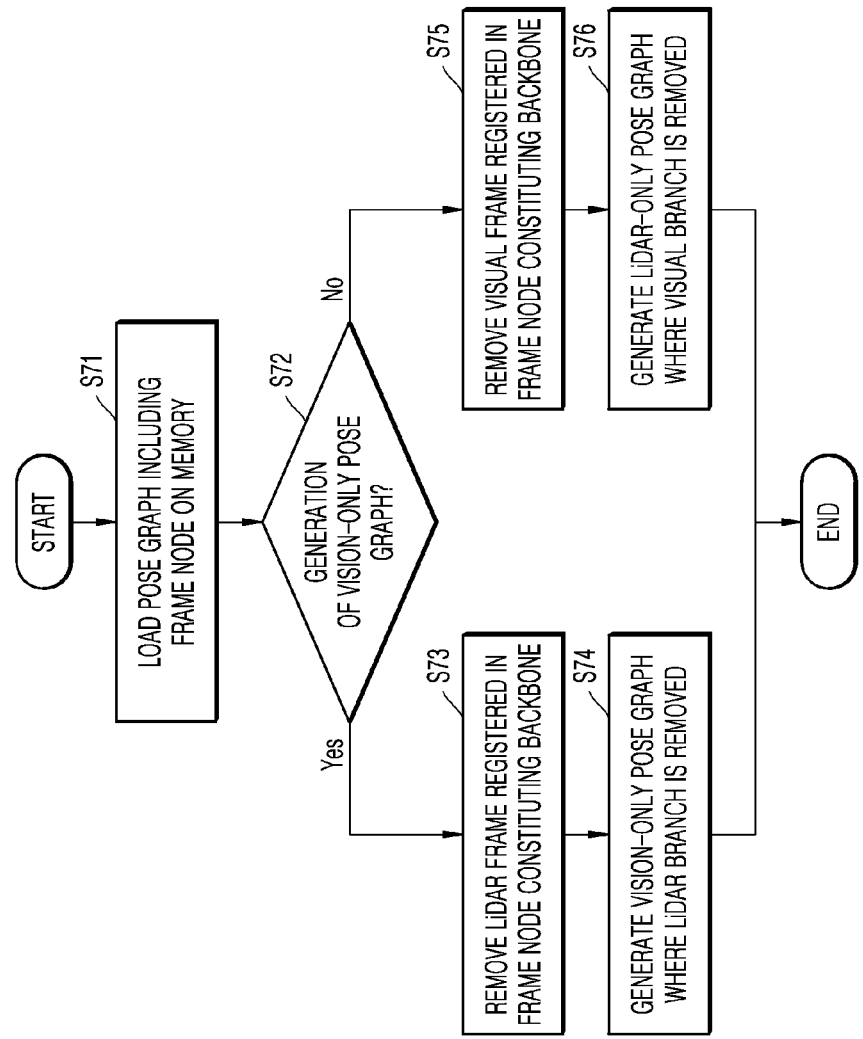
FIG. 11 shows a process of deleting a part of a pose graph according to an embodiment.

FIG. 11 shows a process of removing a part of a pose graph according to an embodiment.

The controller 250 loads the pose graph including a frame node onto a memory (S71). Additionally, step 71 is branched on the basis of whether a vision-only pose graph is generated (S72). In the case in which the vision-only pose graph is generated, the controller 250 removes a LiDAR frame, registered in a frame node constituting a backbone, from the loaded pose graph (S73). Additionally, the controller 250 generates a vision-only pose graph in which a LiDAR branch is removed from the pose graph (S74). FIG. 9 shows the results.

During SLAM of a robot that does not include the LiDAR sensor 220, the controller 250 may estimate a position of the robot using the map in FIG. 9.

In the case in which a LiDAR-only pose graph is generated in step 71, the controller 250 removes a visual frame, registered in a frame node constituting a backbone, from the pose graph (S75). Additionally, the controller 250 generates a LiDAR-only pose graph in which a visual branch is removed from the pose graph (S76). FIG. 10 shows the results.

During SLAM of a robot that does not include the camera sensor 230, the controller 250 may estimate a position of the robot using the map in FIG. 10.

Figure 12:
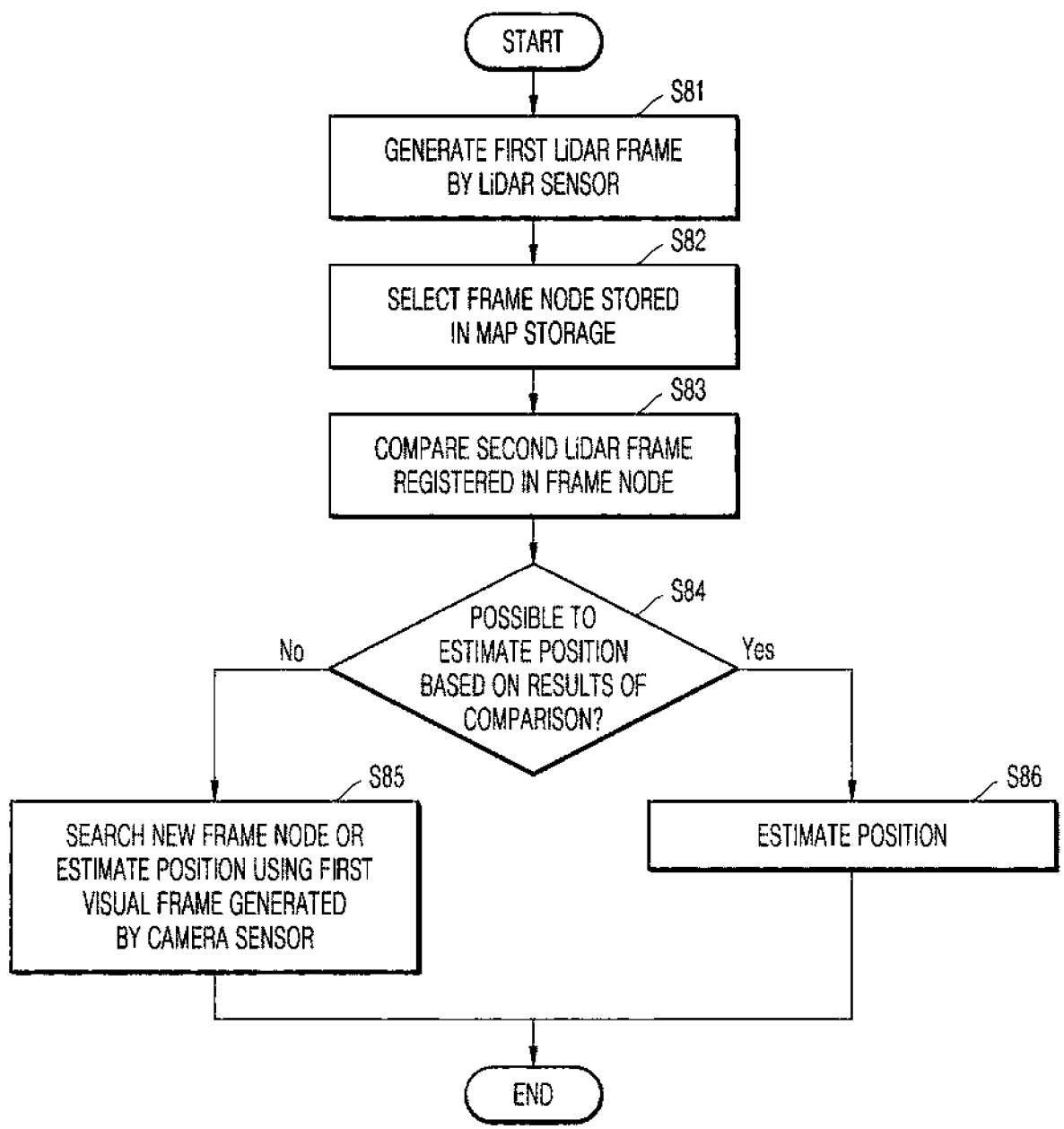
FIG. 12 shows a process of estimating a position based on a LiDAR sensor using the present disclosure.

FIG. 12 shows a process of estimating a position based on a LiDAR sensor using the present disclosure. The robot may further include a camera sensor.

The LiDAR sensor 220 may sense a distance between an object placed outside of the robot and the robot, and may generate a first LiDAR frame (S81). Additionally, the controller 250 selects a frame node stored in the map storage 210 (S82). In selecting a frame node, odometry information, in which the robot moves with respect to the frame node that is confirmed previously, may be used.

The controller 250 compares the generated first LiDAR frame and a second LiDAR frame registered in the frame node (S83). When a position can be estimated on the basis of results of the comparison (S84), the controller 250 estimates a current position of the robot (S86).

When failing to estimate a position in step 84, the controller 250 searches a new frame node in a backbone of the map storage 210 or estimates a position using a first visual frame generated by the camera sensor 230 (S85).

The map storage 210 stores the above-described pose graph. The map storage 210 stores a LiDAR branch including a plurality of LiDAR frames that may be compared with the first LiDAR frame. Further, the map storage 210 stores a visual branch including a plurality of visual frames that may be compared with the first visual frame.

The map storage 210 stores a pose graph including a backbone including two or more frame nodes registered with any one or more of the stored LiDAR frame or the stored visual frame. Additionally, the map storage 210 stores odometry information between frame nodes.

According to the type of a sensor provided by the robot, the map storage 210 may store a pose graph from which a LiDAR branch is removed (FIG. 9), or may store a pose graph from which a visual branch is removed (FIG. 10).

Additionally, the controller 250 may estimate a position by comparing a frame, registered in the frame node of the pose graph, with the first LiDAR frame or the first visual frame. Alternately, the controller 250 may calculate a current position of the robot using the odometry information.

When failing to estimate a position with the LiDAR sensor, the controller 250 extracts a new LiDAR frame. For example, the controller 250 searches the backbone for a first frame node corresponding to the current position to extract a second LiDAR frame registered in the first frame node.

Additionally, the controller 250 may determine that the two frames are different as a result of comparison between the first LiDAR frame and the second LiDAR frame. The controller 250 may extract a third LiDAR frame adjacent to the second LiDAR frame from the LiDAR branch, may compare the first LiDAR frame and the third LiDAR frame, and may calculate a current position of the robot.

When still failing to estimate the position with the LiDAR sensor, the robot may use a visual frame. That is, the controller 250 extracts a second visual frame registered in the first frame node when the first LiDAR frame and the third LiDAR frame are different as a result of comparison between the two frames.

Additionally, the controller 250 calculates a current position of the robot by comparing the first visual frame and the second visual frame.

When failing to estimate the position with respect to the frame node currently confirmed, using the LiDAR frame or the visual frame, the controller 250 may search a new frame node. For example, when failing to estimate a position even though the controller 250 determines that a frame node is v2 in the configuration of FIG. 4, the controller 250 may search v1 or v3 adjacent to v2 as a new frame node.

Alternately, the controller 250 may extract a visual frame or a LiDAR frame from the map storage 210 in addition to the keyframe currently registered in the frame node, and may compare the visual frame or the LiDAR frame with a first LiDAR frame/first visual frame acquired at the current position.

Figure 13:
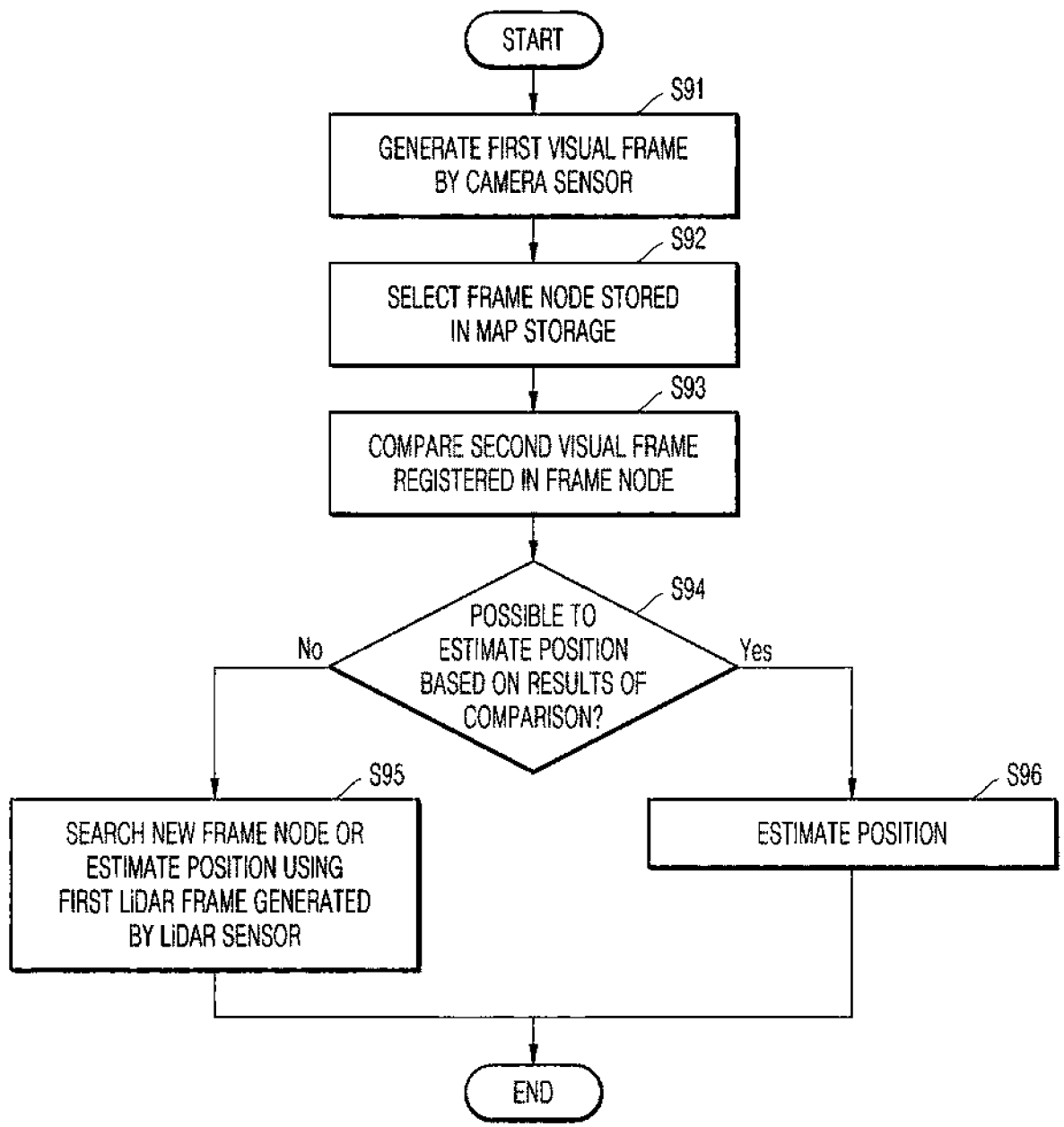
FIG. 13 shows a process of estimating a position based on a camera sensor using the present disclosure.

FIG. 13 shows a process of estimating a position based on a camera sensor using the present disclosure. The robot may further include a LiDAR sensor.

The camera sensor 230 captures image of an object placed outside of the robot, and generates a first visual frame (S91).

Additionally, the controller 250 selects a frame node stored in the map storage 210 (S92). In selecting a frame node, odometry information, in which the robot moves with respect to a frame node previously confirmed, may be used.

The controller 250 compares the generated first visual frame and a second visual frame registered in the frame node (S93). When a position can be estimated on the basis of results of the comparison (S94), the controller 250 estimates a current position of the robot (S96).

When the position cannot be estimated in step 94, the controller 250 estimates the position by searching a backbone of the map storage 210 for a new frame node or by using a first LiDAR frame generated by the LiDAR sensor 220 (S95).

Specifically, when a position cannot be estimated with the camera sensor, the controller 250 extracts a new visual frame. For example, the controller 250 searches the backbone for a first frame node corresponding to the current position and extracts a second visual frame registered in the first frame node.

Additionally, the controller 250 may determine that the first visual frame and the second visual frame are different as a result of the comparison between the two frames. The controller 250 may extract a third visual frame adjacent to the second visual frame from a visual branch, may compare the first visual frame and the third visual frame and may calculate a current position of the robot.

When still failing to estimate the position with the camera sensor, the robot may use a LiDAR frame. That is, the controller 250 extracts a second LiDAR frame registered in the first frame node when the first visual frame and the third visual frame are different as a result of the comparison of the two frames.

Additionally, the controller 250 calculates a current position of the robot by comparing the first LiDAR frame and the second LiDAR frame.

When failing to estimate the position with respect to the frame node currently confirmed, using the LiDAR frame or the visual frame, the controller 250 may search a new frame node. For example, when failing to estimate a position even though the controller 250 determines that a frame node is v2 in the configuration of FIG. 4, the controller 250 may search v1 or v3 adjacent to v2 as a new frame node.

Alternately, the controller 250 may extract a visual frame or a LiDAR frame from the map storage 210 in addition to the keyframe currently registered in the frame node, and may compare the visual frame or the LiDAR frame with a first LiDAR frame/first visual frame acquired at the current position.

When a LiDAR frame or a visual frame among frame nodes is not registered or a position cannot be estimated, in FIGS. 12 and 13, the controller 250 estimates a current position of the robot with respect to the first frame node that is first searched by the controller 250.

Additionally, the controller 250 may extract a second frame node in which the LiDAR frame or the visual frame is registered, among routes taken by the robot, and may calculate a current position of the robot using odometry information from the second frame node to the first frame node.

According to the above-described embodiments, the controller 250 may generate a single map by combining a camera sensor generating vision information and a LiDAR sensor generating LiDAR information. Additionally, the controller 250 may generate a map on the basis of the information sensed by the sensors, as in FIG. 4. Further, the controller 250 may separate a map into a visual frame-based map, a LiDAR frame-based map and the like, and may estimate a position by independently using each map separated according to the types of sensors held by the robot 1.

Thus, high-quality maps that are mutually compatible may be generated and may be applied to the estimation of positions using frames and keyframes based on different sensors.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

The invention claimed is:

1. A robot for generating a map based on multi sensors and artificial intelligence, the robot comprising:
   a motor configured to move the robot;
   a light detection and ranging (LiDAR) sensor configured to determine a distance between an external object and the robot;
   a plurality of camera sensors configured to capture an image of the external object;
   a controller configured to generate a first graph including:
      a LiDAR branch including one or more LiDAR frames generated by the LiDAR sensor, each of the one or more LiDAR frames generated for a respective position of the robot, and one or more LiDAR keyframes selected from among the one or more LiDAR frames,
      a visual branch including one or more visual frames generated by the camera sensors, each of the one or more visual frames generated for a respective position of the robot, and one or more visual keyframes selected from among the one or more visual frames,
      a backbone including a plurality of frame nodes, wherein each of the frame nodes corresponds to a respective position of the robot that is same as at least a respective position corresponding to a LiDAR keyframe of the one or more LiDAR keyframes or a respective position corresponding to a visual keyframe of the one or more visual keyframes, and odometry information; and a map storage configured to store the first graph and the odometry information, wherein the odometry information comprises rotation and direction information of a wheel while the robot moves between a first location correlated with a first frame node from among the frame nodes and a second location correlated with a second frame node from among the frame nodes, wherein the controller is further configured to select the one or more visual keyframes from among the one or more visual frames based on the one or more visual keyframes having more 3D points than a first criterion, and wherein the controller is further configured to select the one or more LiDAR keyframes from among the one or more LiDAR frames based on an overlapped size of a selected LiDAR keyframe with other LiDAR keyframes being smaller than a second criterion.

2. The robot of claim 1, wherein the controller is further configured to:
generate a new frame node based at least in part on a distance or an angle between a location correlated with a previous frame node of the frame nodes and a current location of the robot,
search the map storage for at least a registrable visual frame of the one or more visual frames or a registrable LiDAR frame of the one or more LiDAR frames using the current location of the robot, and
register the at least the registrable visual frame or the registrable LiDAR frame with the generated new frame node.

3. The robot of claim 2, wherein the registrable visual frame is selected, by the controller, from among the one or more visual frames based at least in part on a distance and an angle between adjacent visual frames among the one or more visual frames and a number of feature points in each visual frame.

4. The robot of claim 2, wherein the registrable LiDAR frame is selected, by the controller, from among the one or more LiDAR frames based on separations of respective positions corresponding to the one or more LiDAR frames with respect to a respective position corresponding to a previously registered LiDAR keyframe of the one or more LiDAR keyframes, and
wherein the separation of the respective position corresponding to the registrable LiDAR frame with respect to the respective position corresponding to the previously registered LiDAR keyframe is more than a third criterion.

5. The robot of claim 1, further comprising:
an interface unit configured to receive input information,
wherein the controller is further configured to:
generate a new frame node to be correlated with a current location of the robot,
search the map storage for a registrable visual frame of the one or more visual frames or a registrable LiDAR frame of the one or more LiDAR frames using the generated new frame node, and
register the registrable visual frame or the registrable LiDAR frame with the generated new frame node based at least in part on the interface unit receiving the input information corresponding to a frame node addition.

6. The robot of claim 1, wherein the controller is further configured to generate a second graph in which the LiDAR branch is removed from the first graph, wherein the second graph corresponds to a vision-only graph.

7. The robot of claim 1, wherein the controller is further configured to generate a third graph in which the visual branch is removed from the first graph, wherein the third graph corresponds to a LiDAR-only graph.

8. A robot capable of moving using a map generated based on multi sensors and artificial intelligence, the robot comprising:
a motor configured to move the robot;
a light detection and ranging (LiDAR) sensor configured to determine a distance between an external object and the robot;
a plurality of camera sensors configured to capture an image of the external object;
a map storage configured to store a first graph including:
a LiDAR branch including one or more LiDAR frames generated by the LiDAR sensor, each of the one or more LiDAR frames generated for a respective position of the robot, and one or more LiDAR keyframes selected from among the one or more LiDAR frames,
a visual branch including one or more visual frames generated by the camera sensors, each of the one or more visual frames generated for a respective position of the robot, and one or more visual keyframes selected from among the one or more visual frames,
a backbone including a plurality of frame nodes, wherein each of the frame nodes corresponds to a respective position of the robot that is same as at least a respective position corresponding to a LiDAR keyframe of the one or more LiDAR keyframes or a respective position corresponding to a visual keyframe of the one or more visual keyframes, and
odometry information; and
a controller configured to determine a current location of the robot by using the odometry information or by comparing a frame node of the frame nodes with a first LiDAR frame of the one or more LiDAR frames or a first visual frame of the one or more visual frames,
wherein the odometry information comprises rotation and direction information of a wheel while the robot moves between a first location correlated with a first frame node from among the frame nodes and a second location correlated with a second frame node from among the frame nodes,
wherein the controller is further configured to select the one or more visual keyframes from among the one or more visual frames based on the one or more visual keyframes having more 3D points than a first criterion, and
wherein the controller is further configured to select the one or more LiDAR keyframes from among the one or more LiDAR frames based on an overlapped size of a selected LiDAR keyframe with other LiDAR keyframes being smaller than a second criterion.

9. The robot of claim 8, wherein the controller is further configured to:
search the backbone for a third frame node of the frame nodes that corresponds to the current location of the robot,
extract a second LiDAR frame of the one or more LiDAR frames that is registered with the third frame node,
extract a third LiDAR frame of the one or more LiDAR frames that is adjacent to the second LiDAR frame based at least in part on the first LiDAR frame and the second LiDAR frame being different, and compare the first LiDAR frame and the third LiDAR frame to determine the current location of the robot.

10. The robot of claim 9, wherein the controller is further configured to extract a second visual frame of the one or more visual frames that is registered with the third frame node, wherein the current location of the robot is determined by comparing the first visual frame and the second visual frame based at least in part on the first LiDAR frame and the third LiDAR frame being different.

11. The robot of claim 9, wherein no LiDAR frame of the one or more LiDAR frames or no visual frame of the one or more visual frames is registered with the third frame node, or the current location cannot be estimated, and the controller is further configured to:

estimate the current location of the robot with respect to the third frame node, and extract a fourth frame node of the frame nodes with which a LiDAR frame of the one or more LiDAR frames or a visual frame of the one or more visual frames is registered, wherein the current location of the robot is determined by using odometry information from the fourth frame node to the third frame node.

12. The robot of claim 8, wherein the controller is further configured to:

search the backbone for a third frame node of the frame nodes that corresponds to the current location of the robot, extract a second visual frame of the one or more visual frames that is registered with the third frame node, extract a third visual frame of the one or more visual frames that is adjacent to the second visual frame based at least in part on the first visual frame and the second visual frame being different, and compare the first visual frame and the third visual frame to determine the current location of the robot.

13. The robot of claim 12, wherein the controller is further configured to extract a second LiDAR frame of the one or more LiDAR frames that is registered with the third frame node, wherein the current location of the robot is determined by comparing the first LiDAR frame and the second LiDAR frame based at least in part on the first visual frame and the third visual frame being different.

14. A robot, the robot comprising:

a motor configured to move the robot;

a plurality of sensors;

a map storage configured to store:

a pose graph including a LiDAR branch including one or more LiDAR frames generated by the sensors, each of the one or more LiDAR frames generated for a respective position of the robot, and one or more LiDAR keyframes selected from among the one or more LiDAR frames, a visual branch including one or more visual frames generated by the sensors, each of the one or more visual frames generated for a respective position of the robot, and one or more visual keyframes selected from among the one or more visual frames, a backbone including a plurality of frame nodes, wherein each of the frame nodes corresponds to a respective position of the robot that is same as at least a respective position corresponding to a LiDAR keyframe of the one or more LiDAR keyframes or a respective position corresponding to a visual keyframe of the one or more visual keyframes, and odometry information between the frame nodes; and a controller configured to calculate a current position of the robot by comparing a frame registered with a frame node of the frame nodes with a LiDAR frame of the one or more LiDAR frames or a visual frame of the one or more visual frames, or by using the odometry information, wherein the controller is further configured to select the one or more visual keyframes from among the one or more visual frames based on the one or more visual keyframes having more 3D points than a first criterion, and wherein the controller is further configured to select the one or more LiDAR keyframes from among the one or more LiDAR frames based on an overlapped size of a selected LiDAR keyframe with other LiDAR keyframes being smaller than a second criterion.

15. The robot of claim 14, wherein the sensors comprise a LiDAR sensor configured to determine a distance between an external object and the robot;

wherein the odometry information is generated while the robot moves between a first location correlated with a first frame node from among the plurality of frame nodes and a second location correlated with a second frame node from among the plurality of frame nodes; and wherein the controller is configured to determine a current location of the robot by comparing a frame node of the frame nodes with a first LiDAR frame of the one or more LiDAR frames or by using the odometry information.

16. The robot of claim 15, wherein the controller is further configured to:

search the backbone for a third frame node of the frame nodes that corresponds to the current location of the robot, extract a second LiDAR frame of the one or more LiDAR frames that is registered with the third frame node, and extract a third LiDAR frame of the one or more LiDAR frames that is adjacent to the second LiDAR frame based at least in part on the first LiDAR frame and the second LiDAR frame being different, wherein the current location of the robot is determined by comparing the first LiDAR frame and the third LiDAR frame.

17. The robot of claim 16, wherein no LiDAR frame of the one or more LiDAR frames is registered with the third frame node or the current location cannot be estimated, and the controller is further configured to:

estimate the current location of the robot with respect to the third frame node, and extract a fourth frame node of the frame nodes with which a LiDAR frame of the one or more LiDAR frames or a visual frame of the one or more visual frames is registered, wherein the current location of the robot is determined using odometry information from the fourth frame node to the third frame node.

18. The robot of claim 14, wherein the sensors comprise a plurality of camera sensors configured to capture an image of an external object;

wherein the odometry information is generated while the robot moves between a first location correlated with a first frame node from among the plurality of frame nodes and a second location correlated with a second frame node from among the plurality of frame nodes; and wherein the controller is configured to determine a current location of the robot by comparing a frame node of the frame nodes with a first visual frame of the one or more visual frames or by using the odometry information.

19. The robot of claim 18,
wherein the controller is further configured to:
search the backbone for a third frame node of the frame nodes that corresponds to the current location of the robot,
extract a second visual frame of the one or more visual frames that is registered with the third frame node, and
extract a third visual frame of the one or more visual frames that is adjacent to the second visual frame based at least in part on the first visual frame and the second visual frame being different as a result of comparison by the controller, wherein the current location of the robot is determined by comparing the first visual frame and the third visual frame.

20. The robot of claim 19, wherein no visual frame of the one or more visual frames is registered with the third frame node or the current location cannot be estimated, and
the controller is further configured to:
estimate the current location of the robot with respect to the third frame node, and
extract a fourth frame node of the frame nodes with which a LiDAR frame of the one or more LiDAR frames or a visual frame of the one or more visual frames is registered, wherein the current location of the robot is calculated using odometry information from the fourth frame node to the third frame node.

* * * * *